(12) United States Patent
Horikawa et al.

(10) Patent No.: US 6,210,004 B1
(45) Date of Patent: Apr. 3, 2001

(54) TURNING MECHANISM OF A TEMPLE WITH RESPECT TO A BRACKET AND EYEGLASSES USING THE SAME

(75) Inventors: Kaoru Horikawa; Kazue Yoshimura, both of Sabae (JP)

(73) Assignee: Charmant Co., Ltd., Fukui-ken (JP)

( * ) Notice: Subject to any disclaimer, the term of this patent is extended or adjusted under 35 U.S.C. 154(b) by 0 days.

(21) Appl. No.: 09/482,300

(22) Filed: Jan. 12, 2000

(30) Foreign Application Priority Data

Jan. 13, 1999 (JP) .................................................. 11-006274

(51) Int. Cl.$^7$ ....................................................... G02C 5/22
(52) U.S. Cl. .............................. 351/153; 351/121; 16/228
(58) Field of Search .................................... 351/153, 113, 351/114, 119, 121; 16/228

(56) References Cited

U.S. PATENT DOCUMENTS

| 1,504,212 | 4/1924 | Carlson | 351/121 |
| 1,593,617 | * 7/1926 | Aldridge | 351/153 |
| 4,243,305 | 1/1981 | Elder | 351/121 |
| 5,971,539 | * 10/1999 | Kobayashi | 351/153 |

FOREIGN PATENT DOCUMENTS

| 0 667 552 | 8/1995 | (EP) . |
| 0 902 313 | 3/1999 | (EP) . |
| 0 926 530 | 6/1999 | (EP) . |
| 0 945 751 | 9/1999 | (EP) . |
| 2 658 231 | 8/1991 | (FR) . |
| 773 298 | 4/1957 | (GB) . |
| 60-075816 | 4/1985 | (JP) . |
| 3031979 | 9/1996 | (JP) . |
| WO 94/28454 | 12/1994 | (WO) . |

* cited by examiner

Primary Examiner—Huy Mai
(74) Attorney, Agent, or Firm—Flynn, Thiel, Boutell & Tanis, P.C.

(57) ABSTRACT

A turning mechanism of a temple with respect to a bracket capable of always keeping the resistance force relative to the turning of the temple T with respect to the bracket and of regulating the resistance force. The turning mechanism comprises a shaft supporting portion provided on the bracket and having a hollow hole section therein, a shaft portion provided on the temple and having a hollow hole section therein, and an expansion member, wherein the expansion member is press-fitted in the hollow hole section of the shaft portion in a state where the shaft portion is fitted in the shaft supporting portion to produce a friction force due to a pressing force of the expansion member, thereby applying a resistance force against the turning of the temple.

12 Claims, 12 Drawing Sheets

TURNING MECHANISM OF A TEMPLE WITH RESPECT TO A BRACKET AND EYEGLASSES USING THE SAME

BACKGROUND OF THE INVENTION

1. Field of the Invention

The invention relates to eyeglasses, more particularly to a turning mechanism of a temple with respect to a bracket having no hinge.

2. Description of the Related Art

There has been hitherto employed in eyeglasses a hinge serving as a turning mechanism for pivotally coupling between a bracket integrated with a front frame and a temple.

However, screws, bolts and the like serving as shafts of the hinge of the eyeglasses of this type have been loosened by frequently pivoting the temple with respect to the temple with respect to the bracket, so that the temple has been rickety. Further, there has been a case where bolts which were loosened inadvertently were lost.

Accordingly, it was necessary to fasten screws periodically using a driver for exclusive use, which has been however very troublesome.

To this end, there have been developed turning mechanisms which are different from the turning mechanism using the hinge, namely, developed several kinds of turning mechanisms each having a simple construction having no screw, bolt, and the like.

Among them, there are some turning mechanisms each having an engagement construction wherein a bracket and a temple are pivotally engaged with each other. For example, there is a turning mechanism having a hinge construction as disclosed in Japanese Utility Model Registration No. 3031979, which comprises a hollow cylindrical shaft supporting housing fixed to a lug (so-called bracket) and a shaft fitted to a temple wherein the shaft supporting housing pivotally supports the shaft of the temple.

A friction member in coated onto the inner surface of the shaft supporting housing so that a user feels moderation when turning the temple, thereby preventing the temple from falling down, namely, freely turning toward the bracket because the shaft receives a resistance force.

On the contrary, a friction member fitted to a base end of the temple contacts the inner surface of the shaft supporting housing, thereby preventing the temple from freely tuning toward the bracket likewise.

In these cases, there is an advantage that resistance force is applied to the temple for presenting the free turning of the temple with respect to the lug or bracket. Since the friction member is worn when the temple is repetitively turned with respect to the lug, there is a drawback that the friction force is gradually decreases, resulting in the hindrance of free turning prevention function of the temple with respect to the bracket.

Further, there is another drawback that if a friction force is applied to the temple for recovering the free turning prevention function, the lug and the temple have to be replaced with another lug or temple, which costs much. It is needless to say that it was impossible to regulated a resistance force applied to the temple.

SUMMARY OF THE INVENTION

The invention has been made in view of the foregoing technical background, and solves the drawbacks of the prior turning mechanism and to provide a turning mechanism of eyeglasses capable of always applying resistance force to the temple, namely, against the turning of a temple with respect to a lug without using a hinge and capable of regulating the resistance force.

The inventors have devoted themselves to solve drawbacks of the prior art turning mechanism and found the fact that a temple is formed hollow and an expansion member is press-fitted in the hollow temple due to wedge-like operation, thereby solving the foregoing drawbacks.

To achieve the above object, the turning mechanism of a temple with respect to a bracket and eyeglasses using the same is constructed as follows.

That is, the turning mechanism according to a first aspect of the invention comprises a shaft supporting portion provided on the bracket and having a hollow hole section therein, a shaft portion provided on the temple and having a hollow hole section therein, and an expansion member, wherein the expansion member is press-fitted in the hollow hole section of the shaft portion in a state where the shaft portion is fitted in the shaft supporting portion to produce a friction force due to a pressing force of the expansion member, thereby applying a resistance force against the turning of the temple.

The turning mechanism according to a second aspect of the invention comprises a shaft supporting portion provided on the bracket and having a hollow hole section therein, a shaft portion provided on the temple and having a hollow hole section therein, and an expansion member, and the shaft supporting portion having a notched portion for guiding the turning of the temple, wherein the expansion member is press-fitted in the hollow hole section of the shaft portion of the shaft portion in a state where the shaft portion is fitted in the shaft supporting portion through a notched portion to produce a friction force between the shaft supporting portion and shaft portion due to a pressing force of the expansion member, thereby applying a resistance force against the turning of the temple.

The turning mechanism according to a third subject of the invention comprises a shaft supporting portion provided on the bracket and having a hollow hole section therein, a shaft portion provided on the temple and having a hollow hole section therein, and an expansion member, and the shaft supporting portion having a notched portion for guiding the turning of the temple and a guide groove in which the shaft portion 2 is engaged, wherein the expansion member is press-fitted into the hollow hole section of the shaft portion in a state where the shaft portion is fitted in the shaft supporting portion through the notched portion to produce a friction force between the shaft supporting portion and shaft portion due to a pressing force of the expansion member, thereby applying a resistance force against the turning of the temple T.

The turning mechanism according to a fourth aspect of the invention is characterized in that the expansion member in the third aspect of the invention has a longitudinal groove and the shaft portion has a projection, and the projection is engaged in the longitudinal groove to turn the expansion member and shaft portion together.

The turning mechanism according to a fifth aspect of the invention is characterized in that the shaft portion in the third aspect of the invention has a projection and the projection bites into the expansion member to turn the expansion member and shaft portion together.

The turning mechanism according to a sixth aspect of the invention comprises a shaft supporting portion provided on the bracket and having a hollow hole section therein, a shaft portion provided on the temple and having a hollow hole section therein; an expansion member; and the shaft supporting portion having a notched portion for guiding the turning of the temple, wherein a first expansion body and a second expansion body split by the expansion member are press-fitted into the hole section of the shaft portion while interposing the shaft portion therebetween in a state where the shaft portion is fitted in the shaft supporting portion through the notched portion to produce a friction force between the shaft supporting portion and shaft portion due to a pressing force of the expansion member, thereby applying a resistance force against the turning of the temple.

The turning mechanism according to a seventh aspect of the invention is characterized in that the first expansion body in the sixth aspect of the invention has a longitudinal groove at a convex portion thereof and the shaft portion has a projection wherein the projection is engaged in the longitudinal groove to turn the first expansion body and shaft portion together.

The turning mechanism according to an eighth aspect of the invention is characterized in that the first expansion body and the second expansion body in the sixth aspect of the invention are coupled with each other by interference fit.

The turning mechanism according to a ninth aspect of the invention is characterized in that the shaft portion in the fourth aspect of the invention has a plurality of projection and the expansion member has a plurality longitudinal grooves at positions corresponding to the projections.

The turning mechanism according to a tenth aspect of the invention is characterized in that the shaft portion in the fourth aspect of the invention has a cut groove for letting the hollow hole section open to the outside.

The turning mechanism according to an eleventh aspect of the invention is characterized in that a plurality of notched portions are formed on the shaft supporting portion of the bracket, and a plurality of branched pieces are formed on the shaft portion of the temple corresponding to the notched portions.

Eye glasses according to a twelfth aspect of the invention is provided with a turning mechanism as set forth in the first aspect of the invention.

It is needless to say that to adopt the construction combined by not less than two of the first to second aspects of the invention, if the construction meets the object of the invention.

BRIEF DESCRIPTION OF THE DRAWINGS

FIGS. 12(A)14 12(H) show examples of projections respectively formed on the shaft portion.

DESCRIPTION OF THE PREFERRED EMBODIMENTS

A turning mechanism of a temple with respect to a bracket and eyeglasses using the same are described with referenced Figs. shaft supporting portion 1 to 12.

Figure 1:
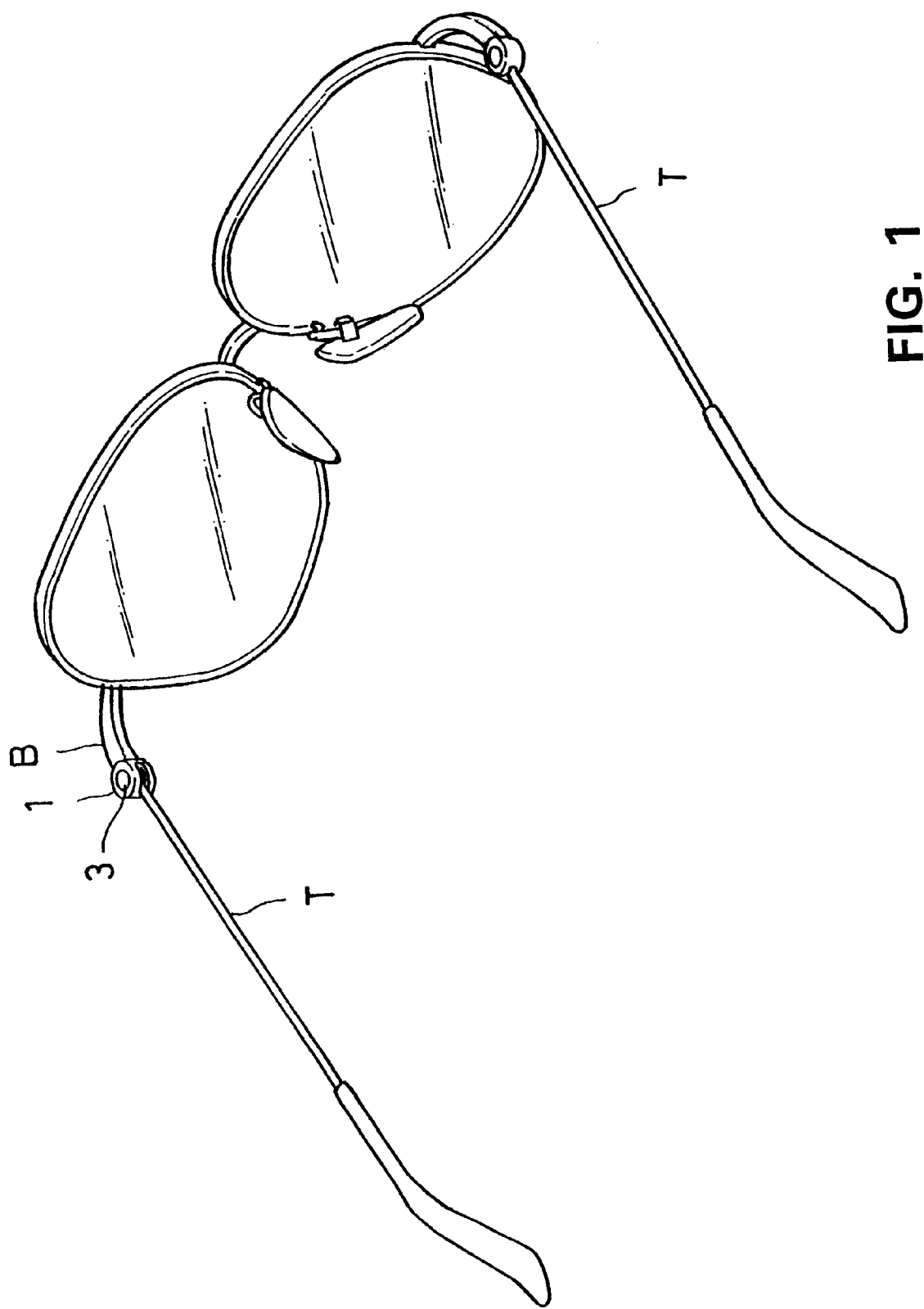
FIG. 1 is a view showing eyeglasses provided with a turning mechanism according to a first embodiment of the invention.
Figure 2:
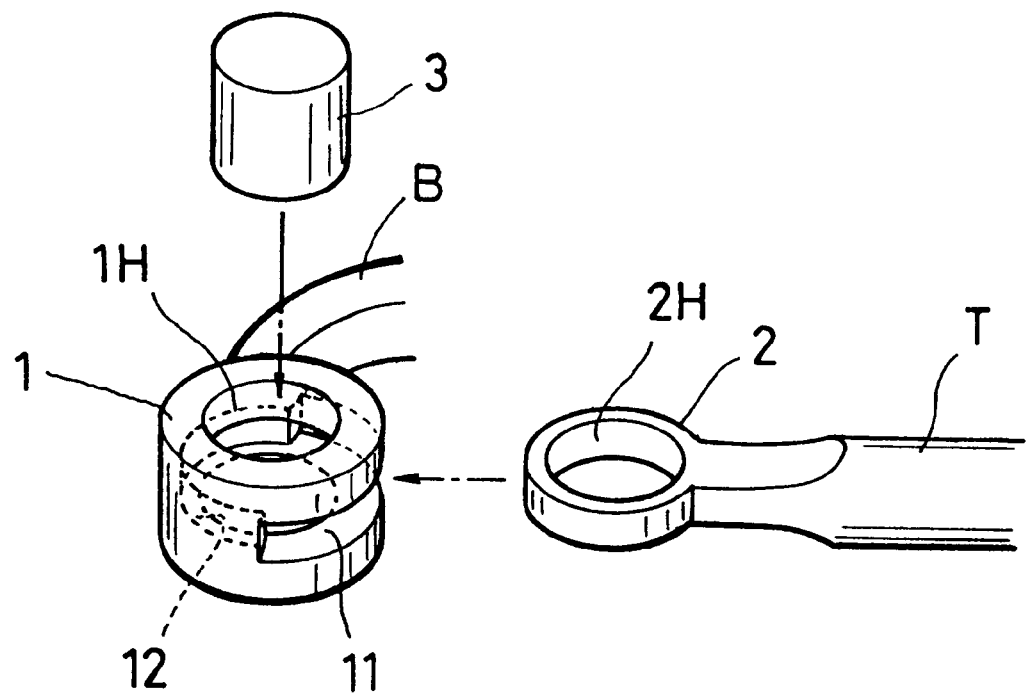
FIG. 2(A) is an exploded view of the turning mechanism in FIG. 1.
FIG. 2(B) shows a modification of a shaft portion constituting the turning mechanism in FIG. 2(A)
Figure 2:
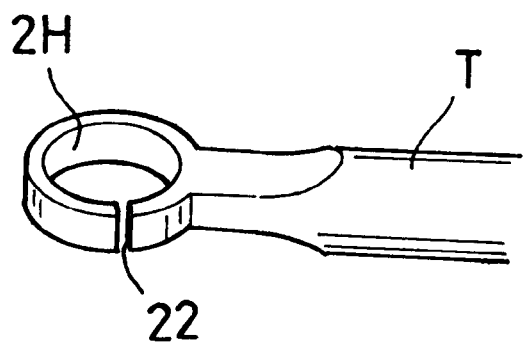
Figure 3:
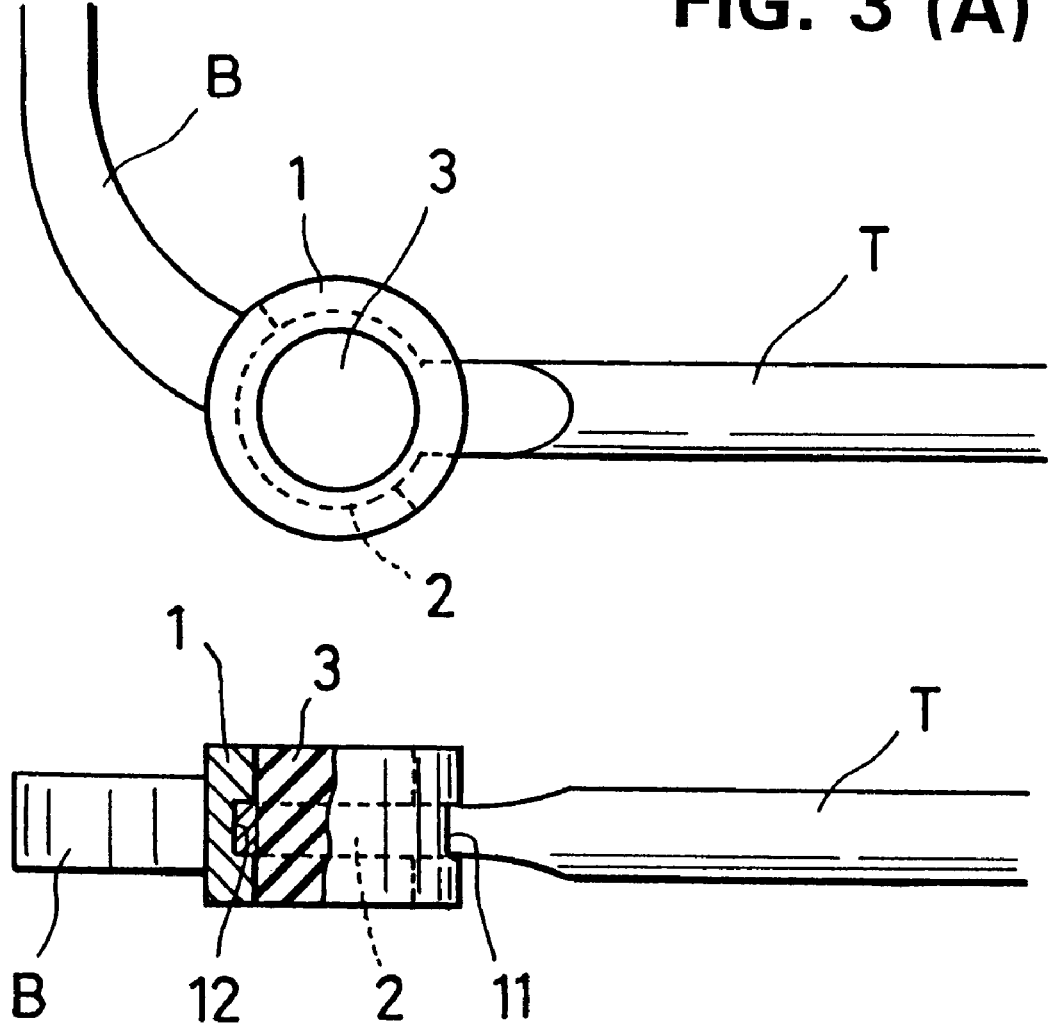
FIG. 3(A) is a front view of the turning mechanism according to the first embodiment.
FIG. 3(B) is a partly sectional side view thereof.

[First Embodiment: FIGS. 1 to 3]

FIG. 1 is a view showing eyeglasses provided with a turning mechanism according to a first embodiment of the invention.

Eye glasses of the invention is characterized in a turning mechanism where a temple T is pivotally supported by a bracket B.

FIG. 2(A) is an exploded view of the turning mechanism and FIG. 2(B) shows a modification of a shaft portion constituting the turning mechanism, and FIG. 3(A) is a front view of the turning mechanism and FIG. 3(B) is a partly sectional side view thereof.

The turning mechanism comprises a bracket B having a shaft supporting portion 1, a temple T having a shaft portion 2, and an expansion member 3 for fixing the shaft supporting portion 1 and the shaft portion 2 to each other while they are pressed against each other.

The shaft supporting portion 1 of the bracket B has a hollow hole section 1H therein, and it is, for example, cylindrical.

The shaft supporting portion 1 has a notched portion 11 provided circumferentially on the side wall thereof and the notched portion 11 has a width through which the shaft portion 2 of the temple T is inserted.

The notched portion 11 smoothly guide the temple T for facilitating the turning thereof after the shaft portion 2 of the temple T is inserted into the shaft supporting portion 1 through the notched portion 11 and engaged into the shaft supporting portion 1, described later in detail.

The shaft supporting portion 1 has a guide groove 12 which is formed on the inner peripheral surface of the hollow hole section 1H thereof and extended from the notched portion 11 for receiving a part of the shaft portion 2 for guiding the shaft portion 2. It is preferable that the guide groove 12 has a width which is the same as the thickness of the shaft portion 2.

With the construction of the turning mechanism, the temple T is not rendered rickety even if it receives a force at its free end opposite to the shaft portion 2 and it continuously performs stable turning without shaking vertically.

The shaft supporting portion 1 is manufactured, separately from a bracket body made of a metal bar, for example, by a material which is first subjected to forging, then to machining or cutting. The separately manufactured shaft supporting portion 1 is jointed to the bracket body by brazing.

On the other hand, the shaft portion 2 provided at the tip end of the temple T has a hollow hole section 2H in which the bracket B is fitted.

The diameter of the hollow hole section 2H is the same as that of the hollow hole section 1H of the shaft supporting portion 1.

The shaft portion 2 is manufactured, for example, by a metal wire which is first subjected to forging to be squashed flat at its end, then boring the squashed portion to form a circular hollow hole section.

The expansion member 3 is cylindrically formed and is pressed into the hollow hole sections of the shaft supporting portion 1 and shaft portion 2 (1H, 2H) so as to operate to press against the latter, namely, it performs a wedge-like operation.

In that sense, the expansion member 3 is manufactured by any material if it can press against the hollow hole sections of the shaft supporting portion 1 and shaft portion 2 (1H, 2H). However, the expansion member 3 is preferably formed of plastics such as polyamide, polyester, polyethylene in view of the facilitation of press-fit. Particularly, polyester elastomer or polyamide elastomer is preferably adopted as the material of the expansion member 3.

The operation for fitting the temple T to the bracket B is described now.

The shaft portion 2 of the temple T is first inserted into the shaft supporting portion 1 of the bracket B through the notched portion 11 of the bracket B, then a part of the shaft portion 2 is brought into intimate contact and engaged with the guide groove 12 formed in the shaft supporting portion 1. In a state where the shaft portion 2 is fitted in the shaft supporting portion 1, the hollow hole section 1H of the shaft supporting portion 1 and the hollow hole section 2H of the shaft portion 2 are coaxially aligned with each other so that the inner peripheral surface of the hollow hole section 1H is flush with that of the hollow hole section 2H of the shaft portion 2.

Then, the expansion member 3 is commonly press-fitted in the hollow hole section 1H of the shaft supporting portion 1 and the hollow hole section 2H of the shaft portion 2. Since the expansion member 3 operates to press against the inner peripheral surfaces of the hollow hole section 2H and the hollow hole section 1H at this time, and hence a function force is produced between the former and the latter.

As set forth above, when the expansion member 3 is fitted to the shaft supporting portion 1 of bracket B and the shaft portion 2 of the temple T in an interference fit manner, a resistance force will be produced between the expansion member 3 and shaft portion 2. Accordingly, the temple T can be stopped at any position so that a user feel moderation when turning the temple T.

Since the area of the shaft supporting portion 1 contacting the expansion member 3 is larger than that of the shaft portion 2 contacting the expansion member 3, a friction force produced in the former is larger than that produced in the latter, which causes the expansion member 3 stationary.

Incidentally, the friction force is also produced between the temple T and bracket B by designing such that the thickness of the shaft portion 2 of the temple T is slightly larger than the width of the guide groove 12 of the shaft supporting portion 1, and the shaft portion 2 is press-fitted into the guide groove 12.

Meanwhile, the length of the notched portion 11 of the shaft supporting portion 1 is determined by the desired opening turning angle of the temple T, and normally ranges to the extent that the temple T can be turned by substantially 90° with respect to the front lenses of eyeglasses. If the turning angle of the temple T is narrowed, for example, it is set to 60°, it is preferable to provide a cut groove 22 on the hollow hole section 2H of the shaft portion 2 to let it open to the outside.

In this case, even if the length of the notched portion 11 is shortened, there is an advantage that the shaft portion 2 can be forced to press into the notched portion 11 because the shaft portion 2 is contracted by the short length of the shaft portion 2.

According to the first embodiment, it is possible to remove the expansion member 3 from the shaft supporting portion 1 and shaft portion 2 and to press-fit a new expansion member 3 into the hollow hole section 1H of shaft supporting portion 1 and hollow hole section 2H of shaft portion 2, thereby producing new resistance force between the expansion member 3 and shaft supporting portion 1 and expansion member 3 and shaft supporting portion 1. On the contrary, if the expansion member 3 is replaced with another expansion member 3 having a different diameter, the degree of press fit is changed, thereby freely regulating the resistance force against the turning of the temple T.

In either case, since screws, etc. are not used in the turning mechanism, the expansion member 3 can be replaced with another expansion member by a very simple operation such as press-fit of the expansion member 3, which is very convenient for this turning mechanism.

Figure 4:
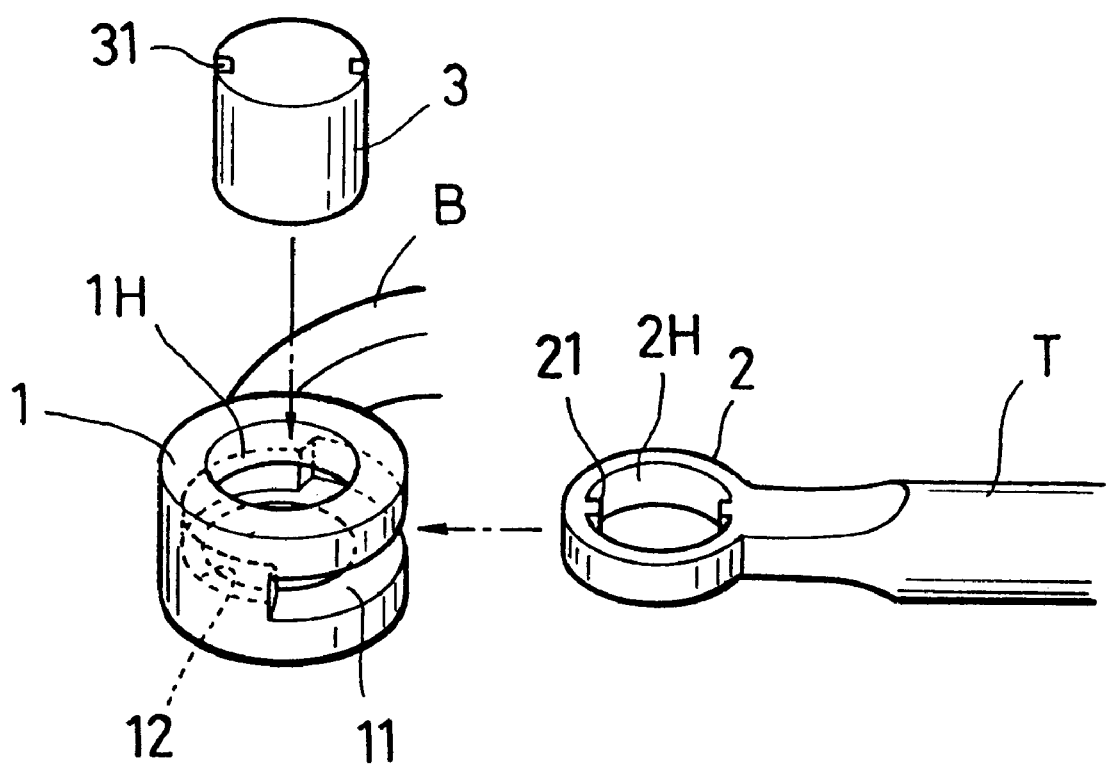
FIG. 4(A) is an exploded view of a turning mechanism according to a second embodiment and FIG. 4(B) shows a modification of a shaft portion constituting the turning mechanism in FIG. 4(A)
Figure 4:
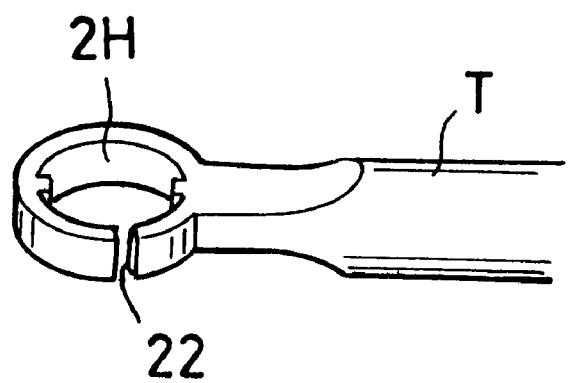
Figure 5:
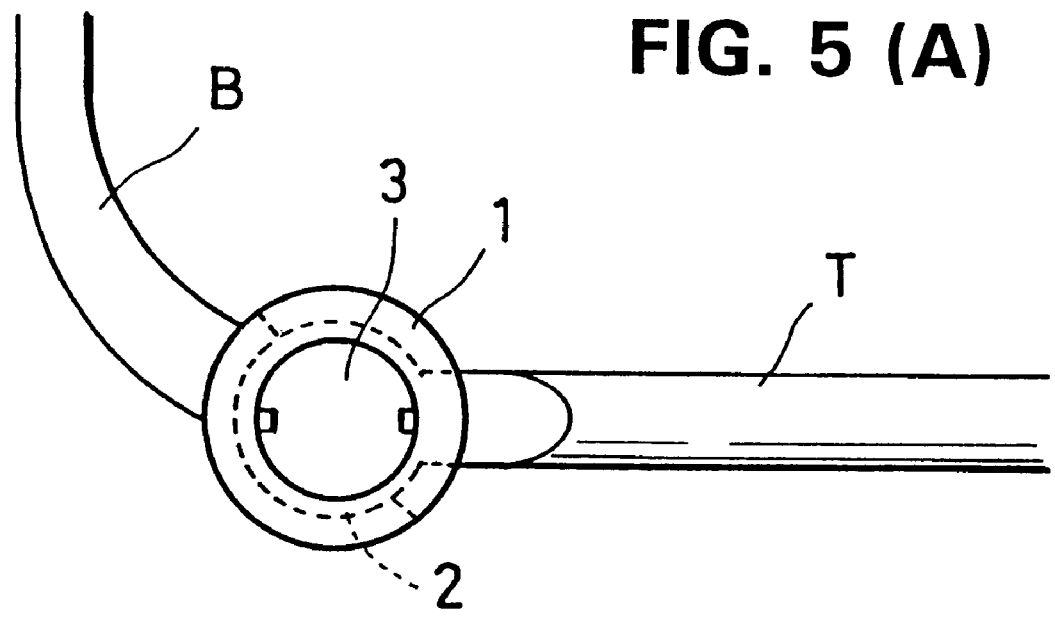
FIG. 5(A) is a front view of the turning mechanism according to the second embodiment and FIG. 5(B) is a partly sectional side view thereof.
Figure 5:
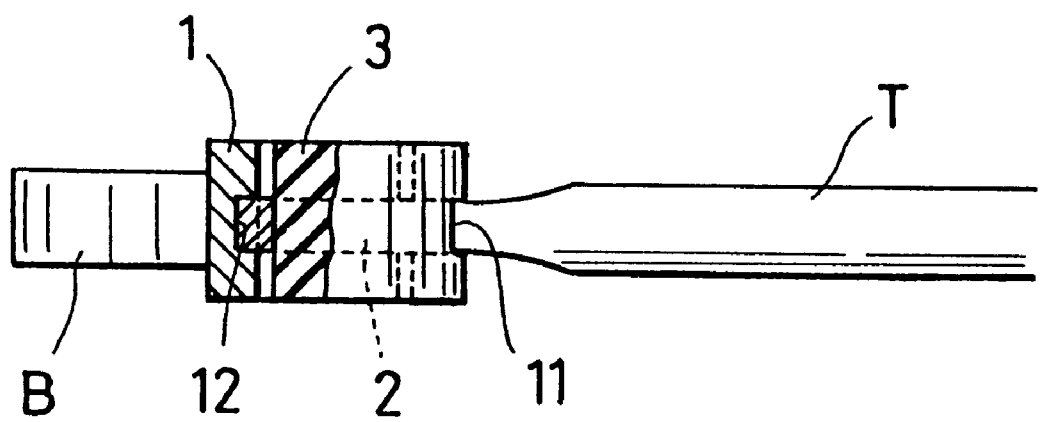

[Second embodiment: FIGS. 4 and 5]

FIG. 4(A) is an exploded view of the turning mechanism according to a second embodiment and FIG. 4(B) shows a modification of a shaft portion constituting the turning mechanism in FIG. 4(A). FIG. 5(A) is a front view of the turning mechanism according to the second embodiment and FIG. 5(B) is a partly sectional side view thereof;

The turning mechanism of the second embodiment is substantially the same as that of the first embodiment except shapes of expansion member 3 and shaft portion 2 of the second embodiment are different from those of the first embodiment.

That is, with the turning mechanism of the second embodiment, longitudinal grooves 31 are formed on the expansion member 3 in the axial direction thereof and projections 21 are formed on a hollow hole section 2H of the shaft portion 2 of the temple T. Accordingly, the expansion member 3 is press-fitted into the shaft supporting portion 1 and shaft portion 2 in a state where the shaft portion 2 is fitted in the shaft supporting portion 1 while the former is coaxially aligned with the latter. At this time, the projection 21 of the shaft portion 2 is press-fitted into the longitudinal groove 31 of the expansion member 3 while the former is engaged in the latter in advance. When the expansion member 3 is completely press-fitted into the shaft supporting portion 1 and shaft portion 2, it operates to press against the inner peripheral surfaces of the hollow hole section 2H of the shaft portion 2 and the hollow hole section 1H of the shaft supporting portion 1.

Since the temple T is fitted to the bracket B as set forth above, the shaft portion 2 of the temple T and the expansion member 3 are tuned together when the temple T is turned, it is possible to obtain a resistance force which is larger than that of the first embodiment because of the friction force produced between the expansion member 3 and the shaft supporting portion 1 of the bracket B (the inner peripheral surface of the hollow hole section 1H of the shaft supporting portion 1, in detail).

If the length of the notched portion 11 is shortened while the turning angular interval of the temple T is narrowed, the shaft portion 2 can be easily inserted into the shaft supporting portion 1 through the notched portion 11 by forming the cut groove 22 in the shaft portion 2 as shown in FIG. 4(B).

As a modification of the second embodiment, the turning mechanism may have no longitudinal grooves 31 in the expansion member 3. In this case, when the expansion member 3 is press-fitted into the hollow hole section 1H of the shaft supporting portion 1 and the hollow hole section 2H of the shaft portion 2 after the shaft supporting portion 1 and shaft portion 2 are coaxially aligned with each other, if the expansion member 3 is forced to press into the shaft supporting portion 1 and shaft portion 2, the projections 21 of the shaft supporting portion 1 bite into the surface of the expansion member 3. Accordingly, it is needless to say that the shaft portion 2 of the temple T and the expansion member 3 are turned together when the temple T is turned.

Figure 6:
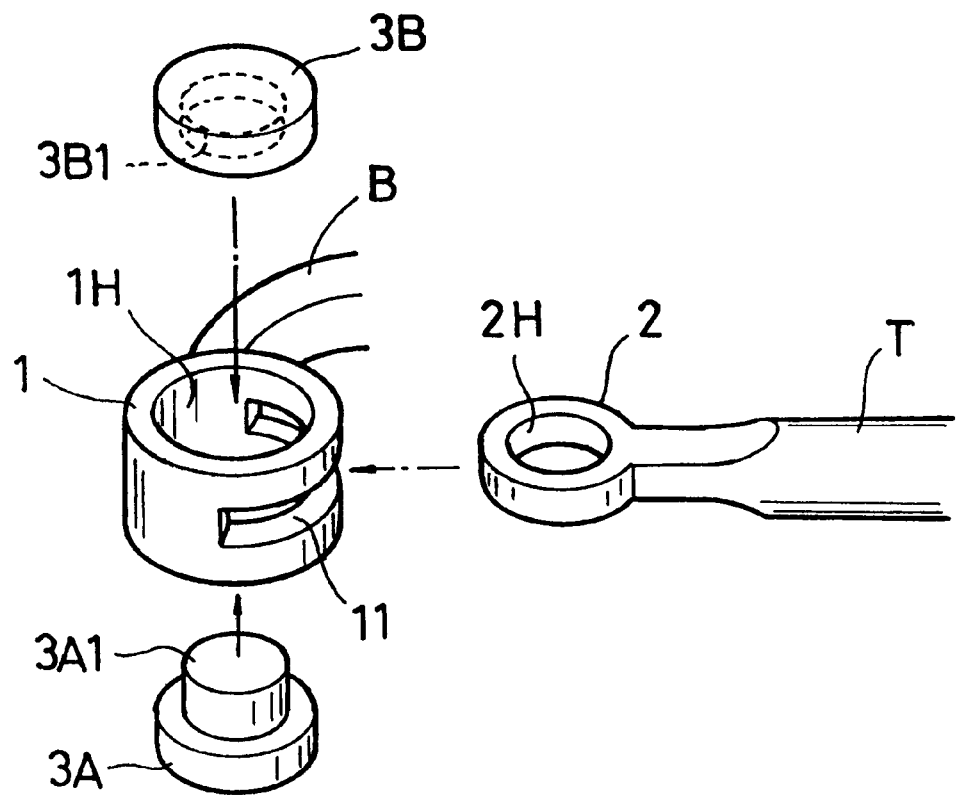
FIG. 6(A) is an exploded view of a turning mechanism according to a third embodiment and FIG. 6(B) shows a modification of a shaft portion constituting the turning mechanism in FIG. 6(A)
Figure 6:
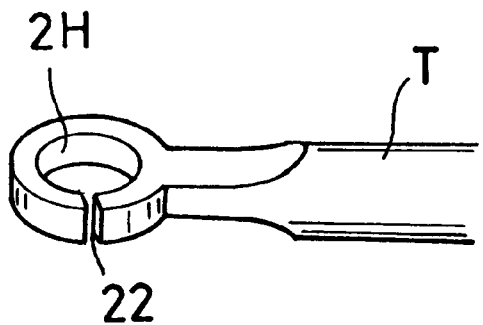
Figure 7:
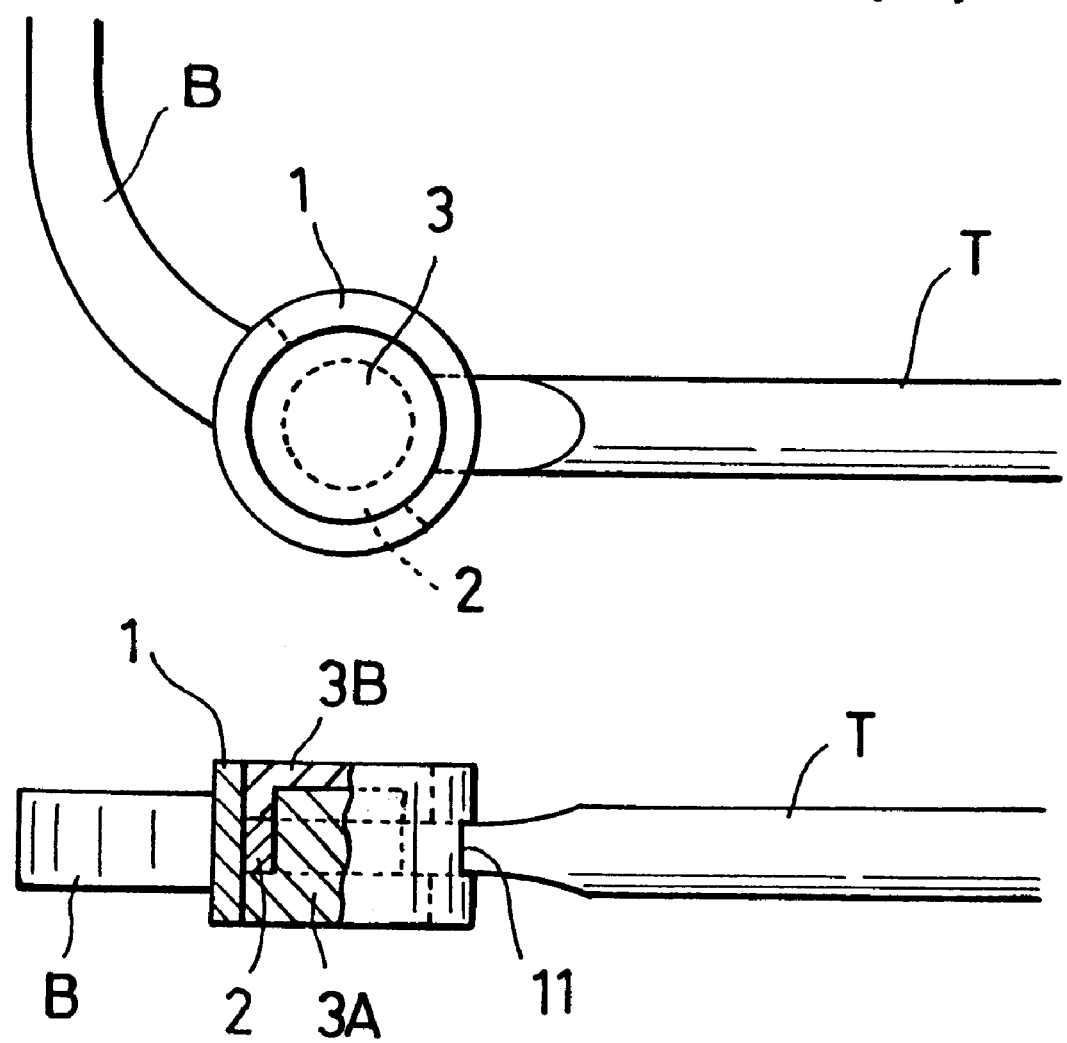
FIG. 7(A) is a front view of the turning mechanism according to the third embodiment and FIG. 7(B) is a partly sectional side view thereof.

[Third embodiment: FIGS. 6 and 7]

FIG. 6(A) shows an exploded view of a turning mechanism according to a second embodiment of the invention and FIG. 6(B) shows a modification of a shaft portion.

FIG. 7(A) shows a front view of the turning mechanism according to the third embodiment and FIG. 7(B) is a partly sectional side view thereof.

The turning mechanism of the third embodiment is largely different from that of the first embodiment in that the expansion member 3 is split into two pieces and the shaft supporting portion 1 has no guide groove 12 therein.

The expansion member 3 is split into a first expansion body 3A and a second expansion body 3B wherein the former has a convex portion 3A1 and the latter has concave portion 3B1 for receiving the convex portion 3A1. The convex portion 3A1 of the first expansion body 3A has a size to be press-fitted into the concave portion 3B1 of the second expansion body 3B, so that they can be surely fitted to each other. The convex portion 3A1 of the first expansion body 3A has a diameter which is slightly larger than that of the hollow hole section 2H for pressing against the inner peripheral surface of the hollow hole section 2H of the shaft portion 2.

With the construction of the turning mechanism, the shaft portion 2 is inserted into the shaft supporting portion 1 through the notched portion 11, then the shaft portion 2 is coaxially aligned with the shaft supporting portion 1. In this state, the first expansion body 3A is press-fitted into the shaft supporting portion 1 from the lower portion thereof while the second expansion body 3B is press-fitted into the shaft supporting portion 1 from the upper portion thereof while interposing the shaft portion 2 therebetween, and at the same time, the convex portion 3A1 of the expansion member 3 is pressed into the concave portion 3B1 of the second expansion body 3B so as to integrate with each other. At this time, since the 3A1 of first expansion body 3A is press-fitted into hollow hole section 2H of the shaft portion 2, a friction force is produced therebetween. The friction force is produced not only between the expansion member 3 and the hollow hole section 2H of the shaft portion 2 but also between the expansion member 3 and the inner peripheral surface of the hollow hole section 1H of the shaft supporting portion 1.

When the expansion member 3 is fitted to shaft supporting portion 1 of the bracket B and shaft portion 2 of the temple T in an interference fit manner, a resistance force is caused to operate between the expansion member 3 and the shaft portion 2 of the temple T. At this time, since the area of the shaft supporting portion 1 contacting the expansion member 3 is larger than that of the shaft portion 2 contacting the expansion member 3 as mentioned in the first embodiment, a friction force produced between the shaft supporting portion 1 and expansion member 3 is larger than that produced between the expansion member 3 and the shaft portion 2 of the temple T to cause the expansion member 3 stationary.

If the length of the notched portion 11 is shortened while the turning angular interval of the temple T is narrowed, the shaft portion 2 can be easily inserted into the shaft supporting portion 1 through the notched portion 11 by forming the cut groove 22 in the shaft portion 2 of the temple T as shown in FIG. 6(B).

Figure 8:
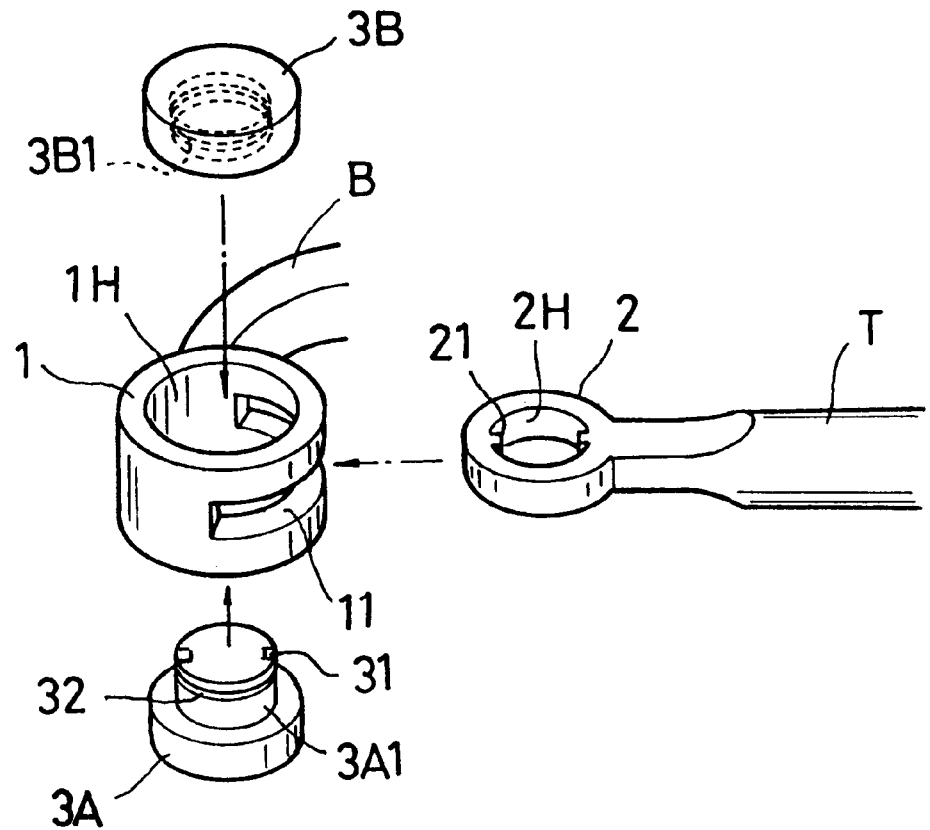
FIG. 8(A) is an exploded view of a turning mechanism according to a fourth embodiment and FIG. 8(B) shows a modification of a shaft portion constituting the turning mechanism in FIG. 8(A)
Figure 8:
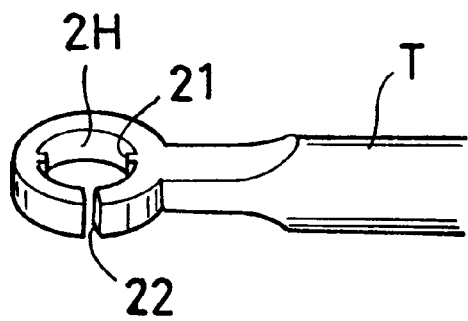
Figure 9:
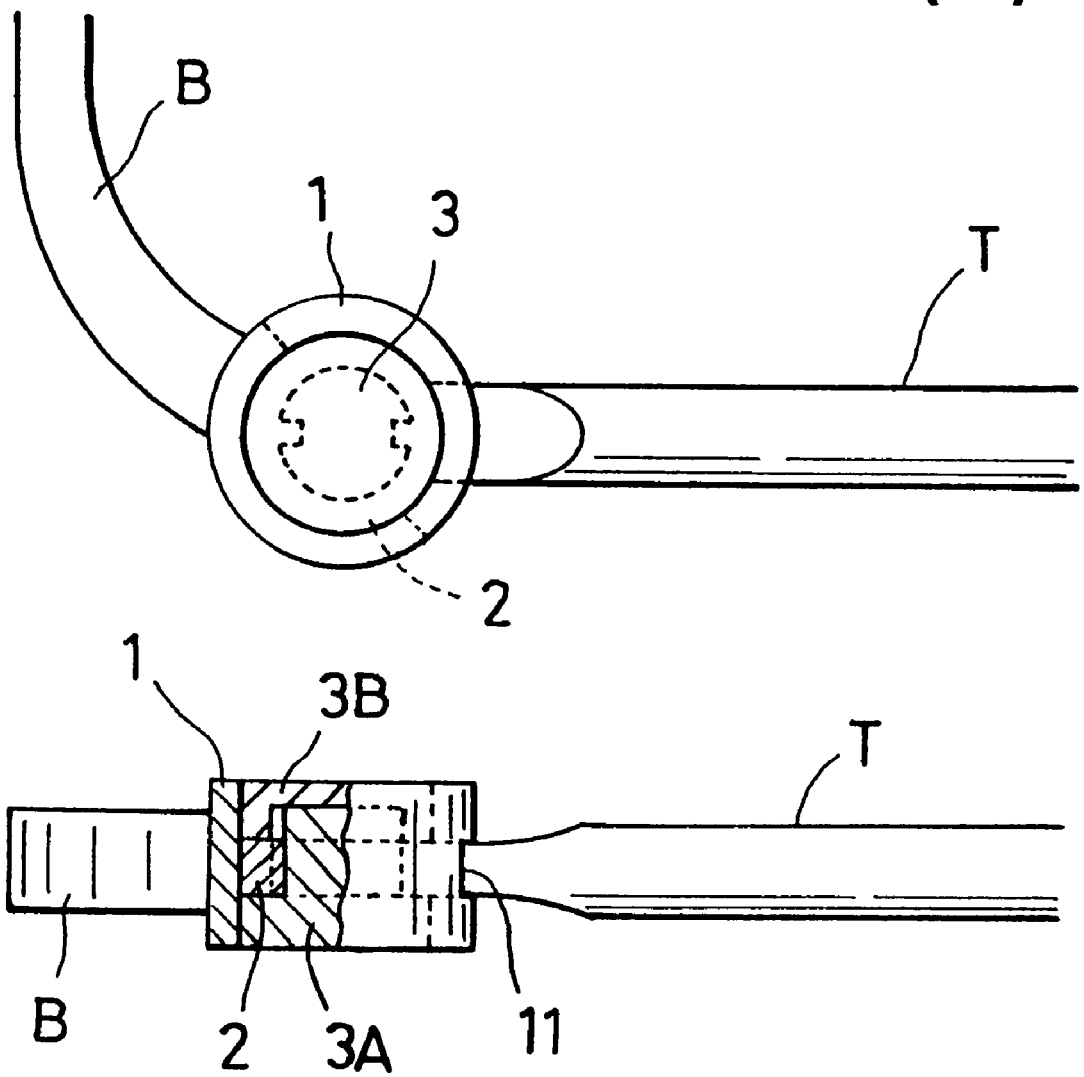
FIG. 9(A) is a front view of the turning mechanism according to the fourth and FIG. 9(B) is a partly sectional side view thereof.

[Fourth embodiment: FIGS. 8 and 9]

FIG. 8(A) shows an exploded view of a turning mechanism according to a fourth embodiment of the invention and FIG. 8(B) shows a modification of a shaft portion.

FIG. 9(A) is a front view of the turning mechanism according to the fourth and FIG. 9(B) is a partly sectional side view thereof.

The turning mechanism of the fourth embodiment is different from that of the first embodiment in that a convex portion 3A1 of a first expansion body 3A has longitudinal grooves 31 and a hollow hole section 2H of a shaft portion 2 has projections 21. A rib 32 is formed on the outer peripheral surface of the convex portion 3A1 of the first expansion body 3A in the circumferential direction.

When the shaft portion 2 is inserted into the shaft supporting portion 1 through the notched portion 11 so as to coaxially align the shaft portion 2 with the shaft supporting portion 1. In this state, the first expansion body 3A is press-fitted into the shaft supporting portion 1 from the lower portion thereof while the second expansion body 3B is press-fitted into the shaft supporting portion 1 from the upper portion thereof while interposing the shaft portion 2 therebetween. At this time, the second expansion body 3B and the first expansion body 3A are coupled with each other while the projections 21 of the shaft portion 2 are engaged in the longitudinal grooves 31 of the first expansion body 3A. Since there is formed the rib 32 on the first expansion body 3A in the peripheral direction, when the convex portion 3A1 of the first expansion body 3A is press-fitted into the concave portion 3B1 of the second expansion body 3B, the coupling force therebetween becomes stronger.

The hollow hole section 2H of the shaft portion 2 receives a pressing force by the expansion member 3, namely, the convex portion 3A1 of the first expansion body 3A, and hence a friction force is produced between the convex portion 3A1 and the inner peripheral surface of the hollow hole section 2H of the shaft portion 2. In a state where the expansion member 3 is completely pressed into the shaft supporting portion 1, it operates not only to press against the hollow hole section 2H of the shaft portion 2 but also to press against the inner peripheral surface of the hollow hole section 1H of the shaft supporting portion 1.

Since the temple T is fitted to the bracket B as set forth above, the shaft portion 2 of the temple T and the expansion member 3 are tuned together when the temple T is turned, it is possible to obtain a resistance force which is larger than that of the first embodiment because of the friction force produced between the expansion member 3 and the shaft supporting portion 1 of the bracket B (the inner peripheral surface of the hollow hole section 1H of the shaft supporting portion 1, in detail). Further, if the length of the notched portion 11 is shortened while the turning angular interval of the temple T is narrowed, the shaft portion 2 can be easily inserted into the shaft supporting portion 1 through the notched portion 11 by forming the cut groove 22 in the shaft portion 2 of the temple T as shown in FIG. 8(B).

Figure 10:
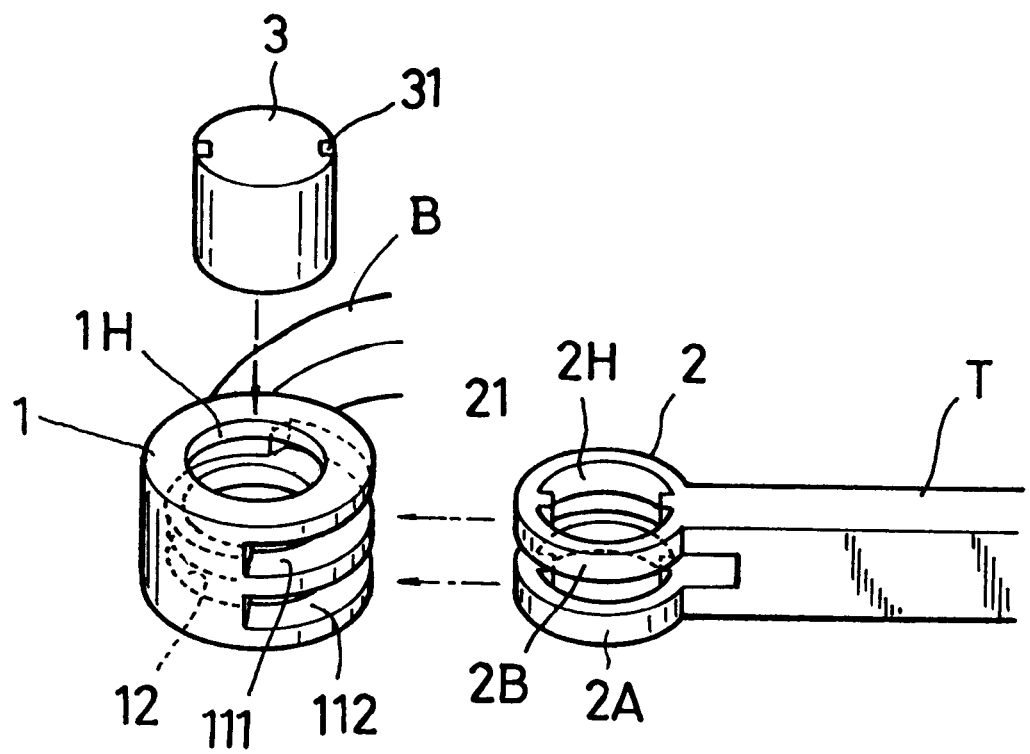
FIG. 10(A) is an exploded view of a turning mechanism according to a fifth embodiment and FIG. 10(B) shows a modification of a shaft portion constituting the turning mechanism in FIG. 10(A)
Figure 10:
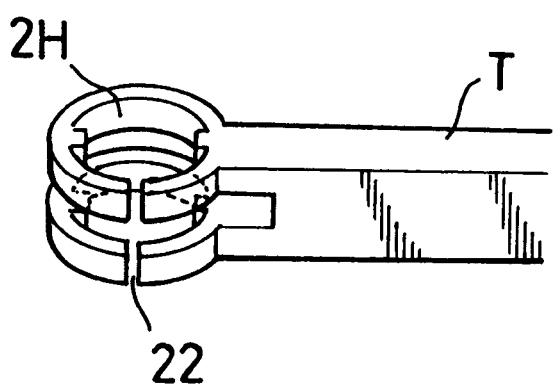
Figure 11:
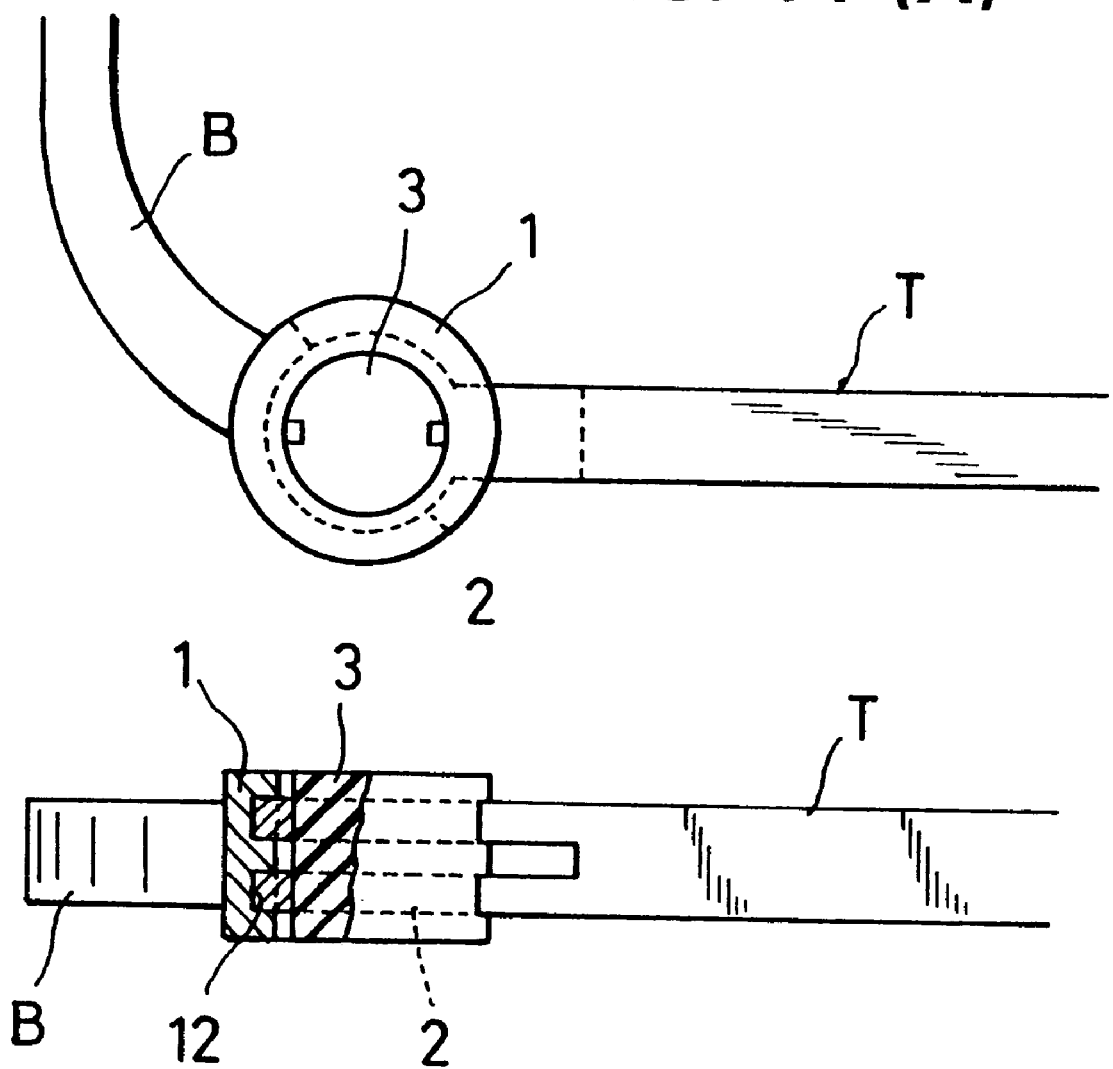
FIG. 11(A) is a front view of the turning mechanism according to the fifth embodiment and FIG. 11(B) is a partly sectional side view thereof.

[Fifth embodiment: FIGS. 10 and 11]

FIG. 10(A) shows an exploded view of a turning mechanism of a fifth embodiment of the invention and FIG. 10(B) shows a modification of a shaft portion.

FIG. 11(A) is a front view of the turning mechanism according to the fifth embodiment and FIG. 11(B) is a partly sectional side view thereof.

The turning mechanism of the fifth embodiment is different from that of the second embodiment in that a shaft portion 2 is branched into two to form the branched shaft portions 2A and 2B and two notched portions 111, 112 are formed in the shaft supporting portion 1 corresponding to the branched shaft portions 2A and 2B. There are also provided a pair of guide grooves 12 corresponding to the number of the shaft portion and the notched portion.

That is, the shaft portion 2 of the temple T is branched into two at the tip end of the temple T to form the branched shaft portions 2A and 2B, wherein a space having a give width is formed between the branched shaft portions 2A and 2B. A pair of two notched portions 111, 112 are provided on the shaft supporting portion 1 of the bracket B corresponding to the branched shaft portions 2A and 2B.

With the construction of the turning mechanism, since the branched shaft portions 2A and 2B are inserted into the shaft supporting portion 1 through the two notched portions 111, 112, and they are turned while they are guided by the guide grooves 12, the temple T is turned while scarcely shaking in the turning axial direction, so that the turning of the temple T is stabilized, resulting in excellent strength in the turning mechanism.

Although the turning mechanism of a temple with respect to a bracket and eyeglasses using the same of the invention has been described in detail, the invention is not limited to the first to fifth embodiments, and it can be varied in variety of modifications.

For example, the shape of the shaft supporting portion is not limited to a circular shape but a square or a rectangular shape may be adopted by the invention.

Further, although the shaft supporting portion is provided at the bracket side and the shaft portion is provided at the temple side, it is needless to say that they may be provided vice versa. Even in the turning mechanism in the first to fourth embodiments, it is also needless to say that the shaft portion may be formed of branched shaft portions and the shaft supporting portion may be formed of notched portions corresponding thereto.

Still further, in the fourth embodiment (see FIG. 8) and fifth embodiment (see FIG. 10), it is also possible not to provide the longitudinal groove 31 on the first expansion body 3A or expansion member 3. In this case the projection 21 of the shaft portion 2 bites into the surface of the first expansion body 3A or the surface of the expansion member 3 so that the shaft portion 2 and the expansion member 3 are turned together when the temple T is turned.

Although it is necessary to design that the longitudinal groove provided on the expansion member 3 and the projection provided on the shaft portion are engaged with each other, the number and the shape of the longitudinal groove or projection may be diversified.

Figure 12:
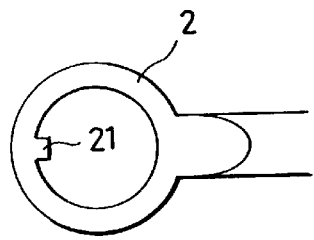
Figure 12:
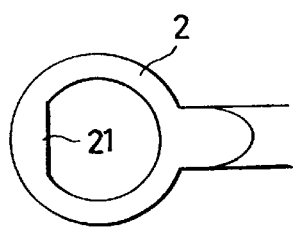
Figure 12:
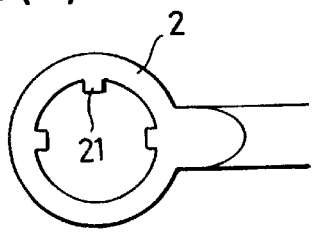
Figure 12:
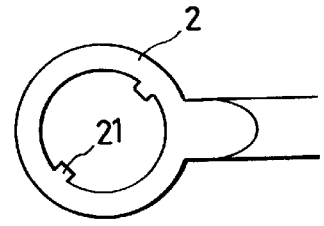
Figure 12:
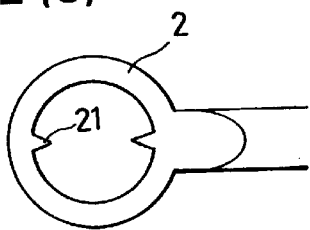
Figure 12:
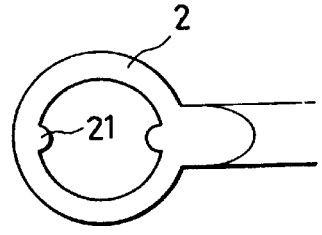
Figure 12:
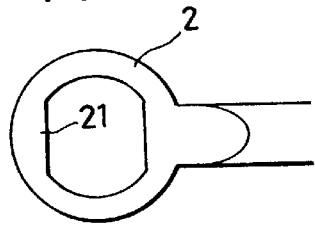
Figure 12:
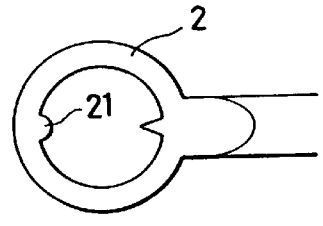

FIG. 12 shows examples of projections respectively formed on the shaft portion. The corresponding expansion member 3 has to use the same number and the shape of those of the projection.

FIG. 12(A) shows a single projection 21.

FIG. 12(B) shows a projection 21 having a large area.

FIG. 12(C) shows three projections 21.

FIG. 12(D) shows a pair of projections 21 which are however displaced in position.

FIG. 12(E) shows a pair of projections 21 which are triangular in shape.

FIG. 12(F) shows a pair of projections 21 which are semicircular in shape.

FIG. 12(G) shows a pair of projections 21 which are however very large and flat.

FIG. 12(H) shows a pair of projections 21 in which one projection is triangular and another corresponding projection is semicircular in shape.

Since hinges are not used in the invention, screws are not loosened, and hence an appropriate resistance force is obtained when tuning the temple. It is possible to always keep the resistance force relative to the turning of the temple with respect to the bracket and the resistance force can be regulated.

Further, if the expansion member is made of plastics, moderate resilience of plastics renders the turning resistance of the temple more appropriate. The temple and the bracket can be fitted to each other by the expansion member one-touch simple operation.

What is claimed is:

1. A turning mechanism of a temple with respect to a bracket and eyeglasses using the same comprising:
   a shaft supporting portion provided on the bracket and having a hollow hole section therein,
   a shaft portion provided on the temple and having a hollow hole section therein; and
   an expansion member;
   wherein the expansion member is press-fitted in the hollow hole section of the shaft portion in a state where the shaft portion is fitted in the shaft supporting portion to produce a friction force due to a pressing force of the expansion member, thereby applying a resistance force against the turning of the temple.

2. The turning mechanism according to claim 1, wherein the shaft portion has a cut groove for letting the hollow hole section open to the outside.

3. The turning mechanism according to claim 1, wherein a plurality of notched portions are formed on the shaft supporting portion of the bracket, and a plurality of branched pieces are formed on the shaft portion of the temple corresponding to the notched portions.

4. Eye glasses provided with a turning mechanism as set forth in claim 1.

5. A turning mechanism of a temple with respect to a bracket of eyeglasses comprising:
   a shaft supporting portion provided on the bracket and having a hollow hole section therein;
   a shaft portion provided on the temple and having a hollow hole section therein; and
   an expansion member; and
   the shaft supporting portion having a notched portion for guiding the turning of the temple;

wherein the expansion member is press-fitted in the hollow hole section of the shaft portion in a state where the shaft portion is fitted in the shaft supporting portion through a notched portion thereof to produce a friction force between the shaft supporting portion and shaft portion due to a pressing force of the expansion member, thereby applying a resistance force against the turning of the temple.

6. A turning mechanism of a temple with respect to a bracket of eyeglasses comprising:

a shaft supporting portion provided on the bracket and having a hollow hole section therein;

a shaft portion provided on the temple and having a hollow hole section therein; and an expansion member; and the shaft supporting portion having a notched portion for guiding the turning of the temple and a guide groove in which the shaft portion is engaged;

wherein the expansion member is press-fitted into the hollow hole section of the shaft portion in a state where the shaft portion is fitted in the shaft supporting portion through the notched portion to produce a friction force between the shaft supporting portion and shaft portion due to a pressing force of the expansion member, thereby applying a resistance force against the turning of the temple.

7. The turning mechanism according to claim 6, wherein the expansion member has a longitudinal groove and the shaft portion has a projection, and the projection is engaged in the longitudinal groove to turn the expansion member and shaft portion together.

8. The turning mechanism according to claim 7, wherein the shaft portion has a plurality of projections and the expansion member has a plurality longitudinal grooves at positions corresponding to the projections.

9. The turning mechanism according to claim 6, wherein the shaft portion has a projection and the projection bites into the expansion member to turn the expansion member and shaft portion together.

10. A turning mechanism of a temple with respect to a bracket of eyeglasses comprising:

a shaft supporting portion provided on the bracket and having a hollow hole section therein;

a shaft portion provided on the temple and having a hollow hole section therein;

an expansion member; and the shaft supporting portion having a notched portion for guiding the turning of the temple;

wherein the expansion member includes a first expansion body and a second expansion body which are press-fitted into the hole section of the shaft portion while interposing the shaft portion therebetween in a state where the shaft portion is fitted in the shaft supporting portion through the notched portion to produce a friction force between the shaft supporting portion and shaft portion due to a pressing force of the expansion member, thereby applying a resistance force against the turning of the temple.

11. The turning mechanism according to claim 10, wherein the first expansion body has a longitudinal groove at a convex portion thereof and the shaft portion has a projection wherein the projection is engaged in the longitudinal groove to turn the first expansion body and shaft portion together.

12. The turning mechanism according to claim 10, wherein the first expansion body and the second expansion body are coupled with each other by interference fit.

* * * * *